United States Patent [19]
Bard et al.

[11] Patent Number: 5,104,150
[45] Date of Patent: Apr. 14, 1992

[54] MULTIPLE PURPOSE IRRIGATION FITTING

[75] Inventors: Shannon Bard, Wheeling, Ill.; Thomas N. Prassas, Glendale, Ariz.

[73] Assignee: Aquapore Moisture Systems, Phoenix, Ariz.

[21] Appl. No.: 613,606

[22] Filed: Nov. 15, 1990

[51] Int. Cl.[5] .................................. F16L 25/00
[52] U.S. Cl. ................................ 285/12; 285/177; 285/175; 285/247; 285/150; 285/155; 285/156; 285/423; 285/901; 285/906; 285/238; 138/89
[58] Field of Search ............ 285/107, 238, 12, 8, 285/906, 247, 351, 177, 175, 150, 155, 156, 423, 901; 138/89

[56] References Cited

U.S. PATENT DOCUMENTS

| | | | |
|---|---|---|---|
| 826,678 | 7/1906 | Marks | 285/238 |
| 1,687,445 | 10/1928 | Hazard | 285/238 |
| 2,940,777 | 6/1960 | Lundberg | 285/238 X |
| 3,971,577 | 7/1976 | Schemith | 285/238 |

FOREIGN PATENT DOCUMENTS

| | | | |
|---|---|---|---|
| 114938 | 3/1942 | Australia | 285/107 |
| 275657 | 7/1966 | Australia | 285/238 |
| 1246490 | 9/1971 | United Kingdom | 285/238 |
| 1421452 | 1/1976 | United Kingdom | 285/238 |

*Primary Examiner*—Dave W. Arola
*Attorney, Agent, or Firm*—Marvin E. Jacobs

[57] ABSTRACT

A tee shaped fitting for connecting together porous and non-porous irrigation tubing and also threaded garden hose as desired in which the three openings each have exterior male threads to engage the hose and interior compression rings to engage the tubing. The fitting is closable at one or more openings with caps so that the one fitting can be used as an elbow, coupling, tee, or end cap thus avoiding the stocking or purchase of many different kinds of fittings.

6 Claims, 1 Drawing Sheet

MULTIPLE PURPOSE IRRIGATION FITTING

DESCRIPTION

1. Technical Field

This invention relates to irrigation systems that use a variety of components selected individually and connected together to form a customized watering system tailored to the particular arrangement of plants served by the system. More specifically, a new fitting is disclosed that can replace a large number of different type prior art fittings so as to make the selection of components easier, save money, increase flexibility, and simplify future modifications and, configuration and layout of the watering system.

2. Background of the Invention

To insure efficient water usage, modern irrigation systems deliver water in controlled amounts precisely to the desired plants so as to avoid runoff and evaporation. Two slightly different prior art designs have matured that are very popular. One employs impervious plastic tubing, usually polyethylene, to convey water through a collection of tee fittings, elbows and couplings so as to distribute the water to the various plants. At each chosen location, a point source emitter attaches to the tubing with a barbed connector inserted through the tube wall.

The other prior art design employs previous or porous tubing, also known as soaker hose in the art, that sweats water along its entire length so as to create a line source suitable for rows of plants and the like. Porous pipe may also be connected together with elbows, couplings and tee shaped fittings to create an elaborate distribution network.

Since these two prior art systems have evolved separately, they generally do not use compatible fittings and are not connectable to each other. It would be advantageous, however, if they could be combined to obtain in a single water circuit the benefits of both types of distribution systems. For example, solid pipe allows the exact positioning of just the right kind of point source emitter to provide a spray pattern optimized for the task, or perhaps a drip at the base of a plant. Porous pipe, on the other hand, is simpler to assemble and maintain. It can be buried underground safe from frost, erosion, and evaporation. But building up a complex water distribution system in either system requires a lot of different parts to be combined and joining both systems into one is not currently practical. This invention overcomes the bulk of the planning problems.

SUMMARY OF THE INVENTION

Briefly, the present invention discloses a multiple purpose fitting that serves the function of several different single purpose fittings in the prior art. At the same time, the multi-purpose fitting accommodates both solid and porous tubing so as to allow the two systems to be combined. As a result, numerous benefits are realized. When one is planning an irrigation system, the task is greatly simplified since one fitting will perform all the functions. The consumer need not count up the number of elbows and couplings and end caps and tees but rather just buy a batch of multi-purpose fittings. If the plan changes during installation, no problems arise. The system can be easily expanded in the future. Also, this invention reduces the number of items that a store must stock. Lower inventories and less complexity yields lower costs so that the irrigation system is more economical. Additional advantages and benefits are elucidated in the following more detailed drawings and descriptions.

DETAILED DESCRIPTION OF THE INVENTION

Figure 1:
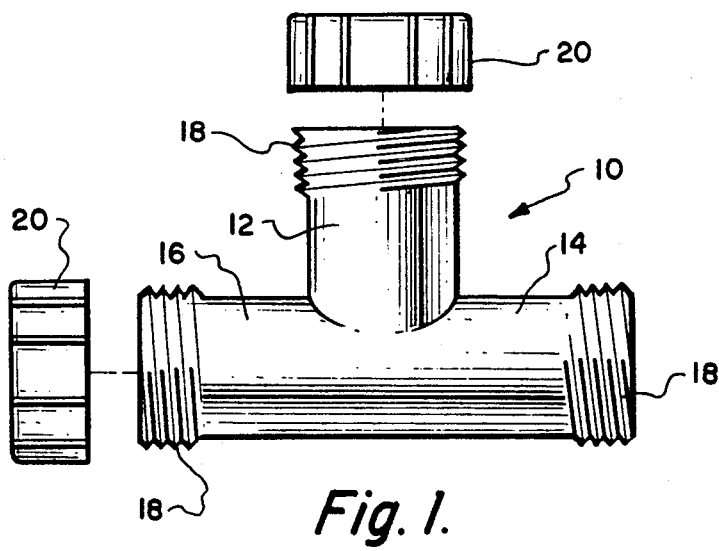
FIG. 1 shows an elevational view of the multiple purpose fitting of the present invention.

The multi-purpose fitting 10 of the present invention is shown in FIG. 1. Fitting 10 comprises a generally hollow, water conveying structure with three openings 12, 14 and 16. Any shape could be adopted but the preferred embodiment is approximately in the shape of a tee with the openings at 90 degree relative angles. All three openings 12, 14 and 16 are similar having male threads 18 on the outside, to accommodate the industry standard female hose thread. One or two caps 20 may be used to close off the openings 12, 14 and 16 as necessary. Caps 20 have interior threads to engage threads 18 on the outside of fitting 10. In the preferred embodiment, the fitting may be made from ABS plastic or the like.

Figure 2:
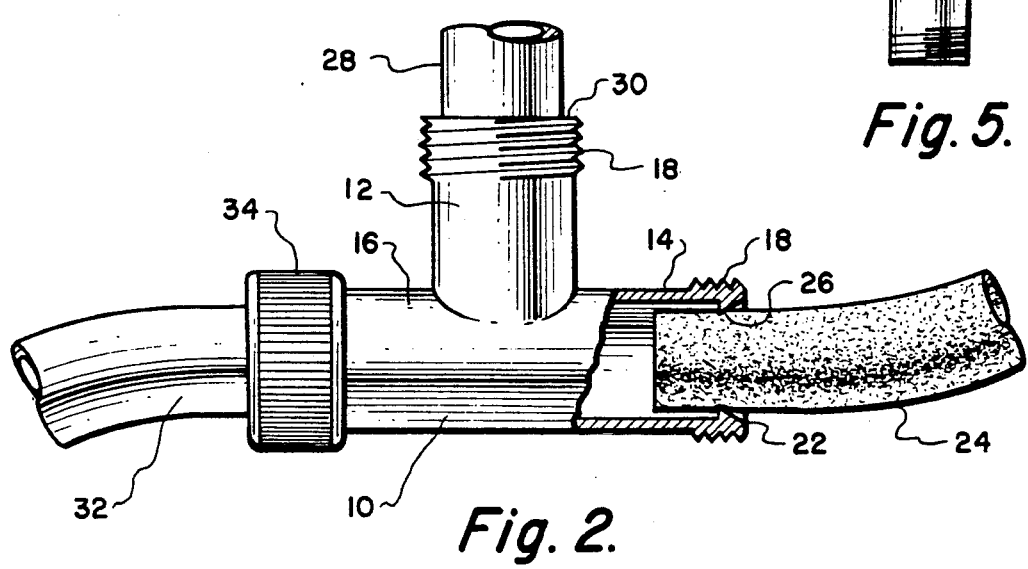
FIG. 2 shows the fitting connected to porous tubing, solid tubing, and conventional threaded garden hose so as to demonstrate the various possibilities with part of the fitting cut away in the FIGURE to enhance understanding of the connection details.

Turning to FIG. 2, opening 14 is partly cut away to show the interior details thereof. A compression ring 22 serves to encircle and grip a tube 24 inserted into opening 14. In this case, tube 24 is a porous type tube to provide a line source irrigation tube. Ring 22 has an inwardly projecting lip 26 of diameter slightly less than the outside diameter of the tube 24. When the tube 24 is forced into opening 14 and pressurized with water, it expands against lip 26 and stays firmly in place in a manner well known to those skilled in the art. In the preferred embodiment of the irrigation system of the instant invention, porous and non-porous tubes are both manufactured with the same outside diameter. Accordingly, a solid tube 28 is also shown in FIG. 2 retained inside opening 12 by means of a similar compression ring 30. Thus, porous and non-porous tubes are connected together in one unified system. Alternatively, the compression rings may have different diameters so as to accommodate different diameter tubing. The compression rings in a single fitting may be of different compression rings. But the simplest and most efficient system would use one diameter for the tubing and compression rings.

The exterior threads 18 also allow the attachment of the familiar garden hose type connector as shown by hose 32 and female hose connected 34 in FIG. 2. Clearly, any type of irrigation component can be connected to any other type using the multiple purpose fitting of the present invention.

Figure 3:
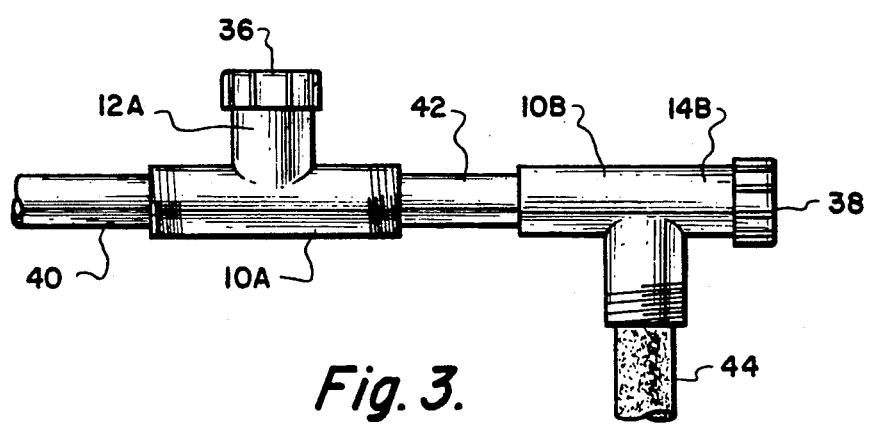
FIG. 3 shows how the fitting may be used as a coupling and an elbow as well, the tee function having been shown in FIG. 2.

In FIG. 3, a fitting 10A is closed on opening 12A with a cap 36 so as to serve as a coupling between tubes 40 and 42. A fitting 10B is closed with a cap 38 on opening 14B so as to form an elbow between tubes 42 and 44. If two openings are closed, the fitting becomes an end cap.

Thus, a low cost universal fitting is disclosed that can provide all the necessary functions of a complex irrigation system.

Figure 4:
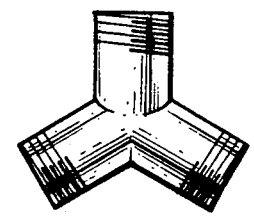
FIG. 4 shows a Y shaped version of the fitting.

FIG. 4 shows a possible alternative shape for a three opening multiple purpose fitting in which the openings are spaced about 120 degrees apart so as to form a Y shaped fitting. This shape functions identically to the tee shaped fitting except that less severe directional changes are imposed on the water flow inside the fitting.

Figure 5:
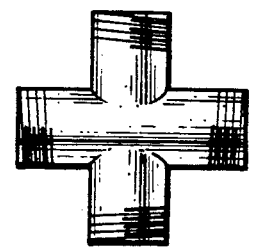
FIG. 5 shows a cross shaped multi-purpose fitting.

FIG. 5 shows an embodiment in which the fitting has the shape of a cross with four openings to permit greater versatility in the creation of a water distribution system. Although the preferred embodiments have the openings, whether three, four, or more, disposed in a plane, it is equally possible to mold out of plane openings as well at some small additional expense. Other modifications will become apparent to those skilled in the art which do not depart from the spirit and scope of this invention as defined by the appended claims.

We claim:

1. A multiple purpose irrigation system fitting for joining together both compatible and incompatible type hoses comprising a water conveying hollow container with multiple openings therein, each of said openings having external threads thereon to engage the standard female threaded connectors of one type of irrigation hose and each of said openings also having an internal compression ring means which is the sole means on said hollow container to engage and sealingly grip a tube inserted therein, said tube comprising another type of irrigation hose.

2. The fitting of claim 1 including at least one end cap having female threads therein and adapted to engage said external threads on said openings so as to close said openings.

3. The fitting of claim 1 in which said container is tee shaped with the openings disposed at approximate right angles relative to each other.

4. The fitting of claim 2 in which the fitting is generally tee shaped, having three openings, and including two end caps.

5. The fitting of claim 1 in which said container is Y shaped with three openings disposed about 120 degrees apart.

6. The fitting of claim 1 in which said container is cross shaped and has four openings.

* * * * *